United States Patent [19]

Ostrowski

[11] E Re. 30,991

[45] Reissued Jul. 6, 1982

[54] VOICE SYNTHESIZER

[75] Inventor: Carl L. Ostrowski, Mount Clemens, Mich.

[73] Assignee: Federal Screw Works, Detroit, Mich.

[21] Appl. No.: 215,681

[22] Filed: Dec. 12, 1980

Related U.S. Patent Documents

Reissue of:

[64] Patent No.: 4,130,730
Issued: Dec. 19, 1978
Appl. No.: 836,589
Filed: Sep. 26, 1977

[51] Int. Cl.[3] ..... G10L 1/00

[52] U.S. Cl. ..... 179/1 SM

[58] Field of Search ..... 179/1 SM, 1 SG, 1 SA, 179/1 SF; 84/1.01; 328/14

[56] References Cited

U.S. PATENT DOCUMENTS 3,102,165 8/1963 Clapper ..... 179/1 SG

OTHER PUBLICATIONS

J. Flanagan, "Speech Analysis, Synthesis, Perception", Springer-Verlag, 1972, pp. 324 and 344.

L. Rabiner, "Digital Formant Synthesizer", J. of Acoustic. Soc. of Am., 43, 822-828, (1968).

*Primary Examiner*—Errol A. Krass
*Assistant Examiner*—E. S. Kemeny
*Attorney, Agent, or Firm*—Harness, Dickey & Pierce

[57] ABSTRACT

A highly simplified speech synthesizer that is capable of producing quality speech. The present speech synthesizer is adapted to be driven by an 8-bit digital input command word. Six of the bits are used for phoneme selection and the remaining two bits for inflection control. In a first embodiment, the system is adapted to generate twelve parameter control signals for each phoneme, with one of the parameters being utilized to control both high and low frequency fricative injection into the vocal tract. This embodiment also provides asynchronous excitation of the vocal tract by including a second fricative excitation control circuit that is adapted to inject white noise in parallel into the second and third resonant filters under the control of the vocal amplitude control signal. In a second embodiment, one of the twelve signal parameters is utilized as two separate control signals thus effectively providing thirteen control signal parameters. The vocal tract in the second embodiment is also driven asynchronously with the glottal waveform being injected in parallel into both the first and second resonant filters. The second embodiment is also adapted to be operated off a portable power supply. A feature of the second embodiment is a phoneme pause control.

20 Claims, 7 Drawing Figures

70
D1
D2
D4
D7
D3
D0
D5
D6
A0
A1
A2
A3
A4
A5
A6
A7
74
CS
+5V
+7.5V
T
(F1)
(F2)
(F2Q)
(VSC)
(FY)
(CL)
(FH)
(CLD)
(VH)
(VD)
(FC)
(FC)
(Timing)
140
128
84
80
82
78
R1
R2
C1
C2
81
96
92
76
LSB
MSB
88
89
112
114
116
72
4029
85

+V1
+V
(F1)
(F2)
(F3)
(FLP)
(VSC)
(F2Q)
(TM)
(FF)
(CL)
(CLD)
(VD)
(FA)
(VA)
4029
CL
A1
A0
T
TR
152
154
156
158
160
162
164
166
168
170
171
172
174
175
176
178
180
182
184
185
186
187
188
190
194
202
204

VOICE SYNTHESIZER

Matter enclosed in heavy brackets [ ] appears in the original patent but forms no part of this reissue specification; matter printed in italics indicates the additions made by reissue.

BACKGROUND AND SUMMARY OF THE INVENTION

The present invention relates to voice synthesizers and in particular to a highly simplified voice synthesizer that is capable of producing quality speech.

In general, the present invention comprises a synthesizer of the type disclosed in copending U.S. application Ser. No. 714,495, filed Aug. 16, 1976, entitled "Voice Synthesizer," and assigned to the assignee of the present application. While the synthesizer disclosed in the cited copending application comprises a highly sophisticated synthesizer capable of producing remarkably realistic sounding speech, the present invention is intended to provide a speech synthesizer that is simpler in design, smaller in size, and less expensive, yet nonetheless capable of producing quality speech.

The present speech synthesizer is adapted to be driven by an 8-bit digital input command word. Six of the bits are used for phoneme selection, thus providing $2^6$ or 64 possible phonemes, and the remaining two bits are dedicated to inflection control. The system is adapted to generate twelve control parameters for each phoneme. In the first embodiment disclosed herein, one of the control signal parameters, referred to as the fricative control, is utilized to control the injection of both high and low frequency fricative energy into the vocal tract. More particularly, the system utilizes the fricative control signal and the inverse of the fricative control signal to control the parallel injection of fricative energy into the second and fourth (F5) resonant filters in the vocal tract. Thus, as will subsequently be explained in greater detail, for a given phoneme having an unvoiced component, fricative energy is injected directly into the F2 and F5 resonant filters, with the amount of fricative energy that is injected into the F2 resonant filter being inversely related to the amount injected into the F5 resonant filter. Also included in the first embodiment is a second fricative excitation control network that is adapted to control the injection of fricative energy in parallel into the second and third resonant filters in the vocal tract under the control of the vocal amplitude control signal. Consequently, the combination of the glottal waveform which is injected into the F1 resonant filter and the vocal amplitude controlled fricative injection into the F2 and F3 resonant filters, provides asynchronous excitation of the serial vocal tract. The result of using white noise as the primary source of excitation of the F2 and F3 resonant filters provides the synthesizer with a more "breathy" sounding voice.

A second embodiment disclosed herein is adapted to operate off a 12 volt power source and thus is particularly suited for use with a portable power supply. The system is also driven by 8-bit digital command words and is adapted to generate twelve electronic control signal parameters per phoneme. One of the control parameters, however is utilized to produce two separate control signals, thus providing an additional control signal without a lot of additional circuitry.

A unique pause control circuit is included in the second embodiment that is adapted to detect the existence of a pause phoneme, and then maintain the values of certain critical parameters beyond the termination of the phoneme preceding the pause to prevent the characteristics of the vocal tract from changing due to transitional changes in the control signal parameters before the audio output has completely faded out. Briefly, the pause control circuit functions by producing an output signal whenever the circuit detects a lack of both the vocal amplitude and fricative amplitude control signals. The output signal produced is then utilized to sample and hold the outputs of a tri-state latch which maintains the current values of the affected parameters. The same output signal is also used to simultaneously disable a pair of analog gates to prevent transitional changes of two additional control signal parameters. The output signal is automatically terminated after a predetermined period of time into the pause phoneme less than the entire duration of the pause phoneme.

The serialized vocal tract in the second embodiment is also asynchronously driven as in the first embodiment, however vocal energy is used for the second excitation signal instead of white noise. More particularly, the glottal waveform that is injected into the first resonant filter is also injected in parallel into the second resonant filter. Thus, due to the inherent delay introduced by the F1 resonant filter, the F2 and F3 resonant filters are effectively driven twice; first by the direct parallel injection of vocal energy into the second resonant filter, and secondly by the delayed excitation from the residual vocal energy from the output of the first resonant filter. The result is an improved sounding voice due to the closer simulation of the true action of the human glottis which actually excites the vocal chords twice during each open and close cycle.

Additional objcts and advantages will become apparent from a reading of the detailed description of the preferred embodiments which makes reference to the following set of drawings in which:

BRIEF DESCRIPTION OF THE DRAWINGS

FIG. 3 is a block diagram of another embodiment of a voice synthesizer according to the present invention.

DETAILED DESCRIPTION OF THE PREFERRED EMBODIMENTS

Figure 1A:
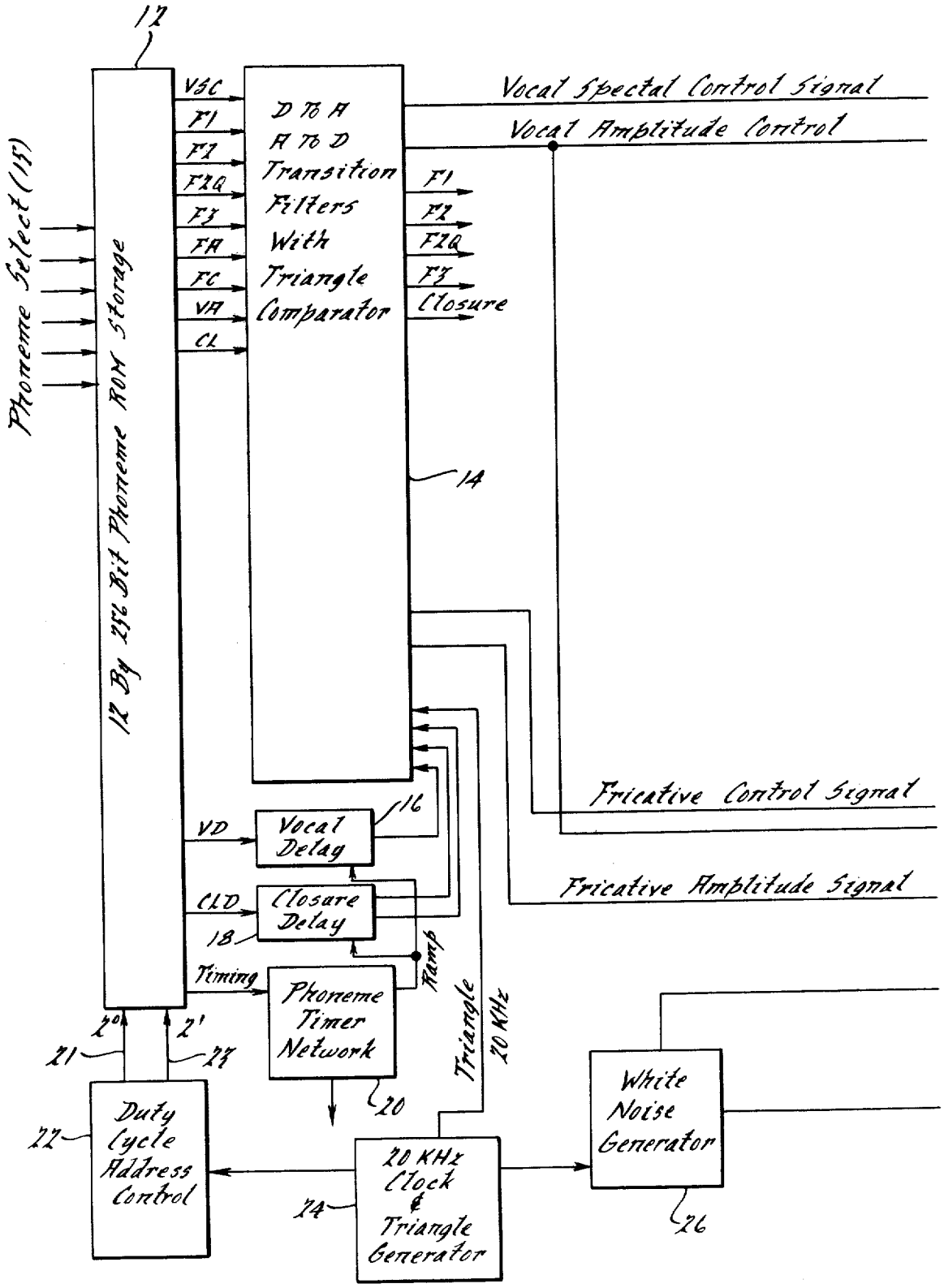
FIGS. 1a and 1b are a block diagram of one embodiment of a voice synthesizer according to the present invention.
Figure 1B:
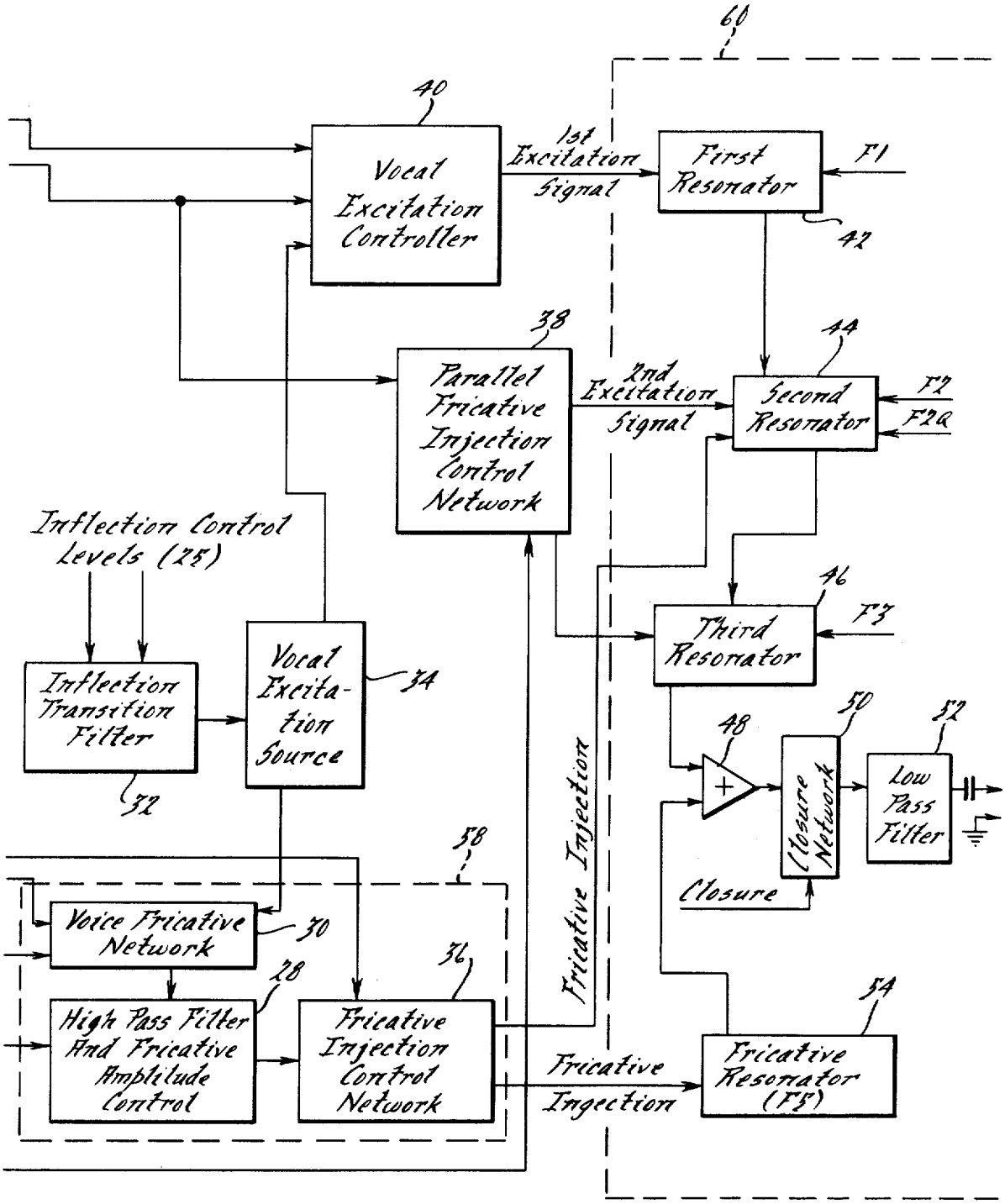

Looking to FIGS. 1a and 1b, a block diagram of one of the preferred embodiments of a voice synthesizer according to the present invention is shown. As previously noted, the present voice synthesizer comprises a simplified and inexpensive version of the more sophisticated type of synthesizer disclosed in the copending U.S. application, Ser. No. 714,495, entitled "Voice Synthesizer," filed Aug. 16, 1976 and assigned to the assignee of the present application. The illustrated system is adapted to be driven by an 8-bit digital command word. Six of the input bits 15 from the digital command word are used for phoneme selection and the remaining two bits 25 for varying the inflection level of the audio output. The six phoneme select bits 15 are provided to a ROM storage unit 12 which has stored therein for each of the 64 ($2^6$) possible phonemes which can be identified by the six phoneme select bits, 12 different parameters which electronically define ech phoneme. Each parameter stored in ROM memory 12 preferably comprises four bits of resolution for producing the serialized binary-weighted digital control signals described in the aforementioned copending application. Thus, the ROM memory unit 12 utilized in the preferred embodiment must have a storage capacity of at least $4\times12\times64$ or 3,072 bits. The memory utilized in the preferred embodiment is a $12\times256$ bit read only memory (ROM).

Storage ROM 12 is adapted to be clocked under the control of a duty cycle address circuit 22 which provides the appropriate timing signals on lines 21 and 23 required for the ROM 12 to generate the serialized binary-weighted duty cycle parameter control signals previously mentioned. The duty cycle address control circuit 22 is connected to a clock circuit 24 that is adapted to produce a square wave clock signal at a frequency 20 KHz. The 20 KHz clock signal from clock circuit 24 is segregated by the duty cycle address control circuit 22 into 15 pulse groups, which are then further divided into time segments of 8, 4, 2 and 1 clock pulses. For each group of 15 clock pulses received, the duty cycle address control circuit 22 provides a HI output signal on line 23 or the MSB line during the eight and four time segments, and a HI output on line 21 or the LSB line during the eight and two time segments.

As previously noted, the serialized binary-weighted digital control parameters generated by ROM 12 preferably contain four bits of resolution. In other words, for each phoneme parameter, ROM 12 contains four bits of information, thereby providing $2^4$ or 16 possible values per parameter. To provide the four bits with their appropriate binary weight, the first or most significant of the four serialized output bits in the control signal parameter is generated when both the signals on lines 21 and 23 are HI; the second bit when the LSB line is LO and the MSB line is HI; the third bit when the LSB line is HI and the MSB line is LO; and fourth or least significant of the four bits when the MSB and LSB lines are both LO. Thus, it can be seen that the first or most significant bit is produced for a period of eight clock pulses, the second bit is produced for a period of four clock pulses, the third bit is produced for a period of two clock pulses, and the fourth bit is produced for a period of one clock pulse. In this manner, an analog signal can be digitally represented as the average magnitude of a control signal over a 15 clock pulse period.

Although known to the art, the particular control signal parameters generated by ROM 12 will be briefly explained to provide a better understanding of the operation of the present system.

The F1, F2, and F3 control signals determine the locations of the resonant frequency poles in the first three variable resonant filters 42, 44, and 46 respectively, in the vocal tract 60. The timing control signal (Timing) is generated for each phoneme and is used to establish the period of production for each phoneme. The vocal amplitude control signal (VA) is generated whenever a phoneme having a voiced component is present. The vocal amplitude control signal controls the intensity of the voiced component in the audio output. The vocal delay control signal (VD) is generated during certin fricative-to-vowel phonetic transitions wherein the amplitude of the fricative constituent is rapidly decaying at the same time the amplitude of the vocal constituent is rapidly increasing. The vocal delay control signal is thus utilized to delay the transmission of the vocal amplitude control signal under such circumstances. The closure signal (CL) is used to simulate the phoneme interaction which occurs, for example, during the production of the phoneme "b" followed by the phoneme "e." In particular, the closure control signal, when provided to the closure network 50, is adapted to cause an abrupt amplitude modulation in the audio output that simulates the build-up and sudden release of energy that occurs during the pronunciation of such phoneme combinations. The vocal spectral contour control signal (VSC) is used to spectrally shape the energy spectrum of the vocal excitation signal. Specifically, the vocal spectral contour control signal controls a first order low pass filter in circuit block 40 that suppresses the vocal energy injected into the vocal tract, with maximum suppression occurring in the presence of purely unvoiced phonemes. The F2Q control signal varies the "Q" or bandwidth of the second order resonant filter 44 in the vocal tract 60, and is used primarily in connection with the production of the nasal phonemes "n," "m" and "ng." Nasal phonemes typically exhibit a higher amount of energy at the first formant (F1), and substantially lower and broader energy content at the higher formants. Thus, during the presence of nasal phonemes, the F2Q control signal is generated to reduce the Q of the F2 resonant filter 44 which, due to the cascaded arrangement of the resonant filters in the vocal tract, prevents significant amounts of energy from reaching the higher formants. The fricative amplitude control signal (FA) is generated whenever a phoneme having an unvoiced component is present and is used to control the intensity of the unvoiced component in the audio output. The closure delay control signal (CLD) is generated during certain vowel-to-fricative phonetic transitions wherein it is desirable to delay the transmission of the closure and fricative amplitude control signals in the same manner as that discussed in connection with the vocal delay control signal. Finally, a unique fricative control signal (FC) is provided which replaces two control signals normally provided in synthesizers of this type; i.e., the fricative frequency and fricative low pass control signals. Specifically, it has been determined that, in general, when a fricative phoneme requires low frequency fricative energy in the range of the F2 formant, it does not also require high freguency fricative energy in the range of the F5 formant, and vice versa. Thus, the present invention utilizes a single fricative control (FC) signal, and the inverse of the FC control signal ($\overline{FC}$), to control the injection of both low and high frequency fricative energy into the vocal tract 60. The specific manner in which this is accomplished will be subsequently explained in greater detail.

The output control signal parameters from ROM 12 are applied to a plurality of relatively slow-acting transition filters 14. In actuality, the binary-weighted duty cycle control signals are effectively converted to analog signals by the transition filters, and then converted back to duty cycle digital signals by comparator amplifiers provided with a 20 KHz triangle clock signal from clock circuit 24. The transition filters 14 are purposefully designed to have a relatively long response time in relation to the steady-state duration of a typical phoneme so that the abrupt amplitude variations in the output control signals from ROM 12 will be eliminated. Thus, the transition filters 14 provide gradual changes between the steady-state levels of the control signal parameters to simulate the smooth transitions between phonemes present in human speech. The response time of the transition filters 14 utilized in the preferred embodiment are fixed, thus eliminating the extensive amount of circuitry necessary to provide variable speech rate capability.

The phoneme timer circuit 20 is adapted to produce a ramp signal that varies from five volts to zero volts in a time period that determines the duration of phoneme production. The slope of the ramp signal produced by the phoneme timer circuit 20 is dependent upon the value of the phoneme timing control signal from ROM 12. The vocal delay control signal (VD) is provided to a vocal delay network 16 which is adapted to delay the transmission of the vocal amplitude control signal for a predetermined period of time less than the duration of a single phoneme time interval whenever the vocal delay control signal is provided by ROM 12. The closure delay control signal (CLD) is provided to the closure delay network 18 which functions similar to the vocal delay network 16 and is adapted to delay the transmission of the fricative amplitude and closure control signals whenever the closure delay control signal is provided by ROM 12.

The two inflection select bits 25 from the 8-bit input command word are provided directly to an inflection transition filter circuit 32 which combines the binary-weighted bits into a single analog inflection control signal, and then supplies the signal to a transition filter which smooths the abrupt amplitude variations in the inflection control signal in the same manner as that previously described with respect to transition filters 14. The output from the inflection transition filter circuit 32 is provided to the vocal excitation or glottal source 34 which generates the voiced excitation signal or glottal waveform. The output from the inflection transition filter 32 determines the pitch of the voiced component, which corresponds to the fundamental frequency ($F\phi$) of the glottal waveform. In the preferred embodiment of the present invention, the glottal waveform generated by the vocal excitation source 34 comprises a truncated sawtooth type waveform similar to that described in copending U.S. application, Ser. No. 714,495, referred to above.

The glottal waveform from the vocal excitation source 34 is provided to the vocal tract 60 via the vocal excitation controller circuit 40. The vocal excitation controller 40 is adapted to spectrally shape the energy content of the glottal waveform in accordance with the vocal spectral contour control signal, and modulate the amplitude of the vocal excitation signal in accordance with the vocal amplitude control signal.

The fricative excitation energy or unvoiced phoneme quantity of human speech is supplied by a white noise generator 26. Injection of the fricative excitation signal into the vocal tract 60 is controlled by the fricative excitation controller circuit 58 and a novel second parallel fricative injection control network 38. The fricative excitation controller 58 is shown broken down into its three individual circuits 28, 30 and 36 to emphasize the unique manner in which injection of the fricative component into the vocal tract 60 is controlled by this embodiment of the present invention. In particular, a conventional voice fricative network 30 is provided which is adapted to modulate the fricative amplitude control signal in accordance with the glottal waveform whenever a phoneme requiring voiced energy is generated, as determined by the existence of a vocal amplitude control signal. The fricative amplitude control signal is then provided to a high pass filter and fricative amplitude control network 28 which is adapted to filter the fricative excitation signal from the white noise generator 26 and modulate the amplitude of the signal in accordance with the fricative amplitude control signal. The modulated fricative excitation signal is then provided to a novel fricative injection control network 36 which is adapted to control the injection of fricative energy into the vocal tract 60 under the control of a single fricative control signal. The fricative excitation signal from the output of the fricative excitation controller 58 is parallel injected into both the F2 resonant filter 44 and the fricative or F5 resonant filter 54.

As previously noted, the output from the white noise generator 26 is also provided to a second parallel fricative injection control network 38. Significantly, it will be noted that the parallel fricative injection control network 38 is adapted to control the injection of fricative energy into the second and third resonant filters 44 and 46 under the control of the vocal amplitude control signal. As will subsequently be explained in greater detail, although the F1, F2 and F3 resonant filters 42, 44 and 46 respectively, are connected in serial form, the vocal excitation signal injected into the F1 resonant filter 42 does not have sufficient energy outside the F1 frequency range to adequately drive the second and third resonant filters, 44 and 46 respectively. Rather, in the embodiment illustrated in FIGS. 1a and 1b, the second and third resonant filters 44 and 46 are driven substantially with white noise under the control of the vocal amplitude control signal. The result of this arrangement is to provide the present voice synthesizer with a more "breathy" or "hoarse" sounding voice.

The output from the first three serially connected resonant filters 42, 44 and 46 are summed with the output from the fifth or fricative resonant filter 54, as indicated at 48, and the combined output is provided through the closure network 50 and a low pass filter 52 to an appropriate audio transducer. The closure network 50 is adapted to abruptly modulate the amplitude of the audio output signal in accordance with the closure control signal as previously described. The low pass filter 52 is adapted to filter the effects of the 20 KHz clock signal from the audio output.

Figure 2A:
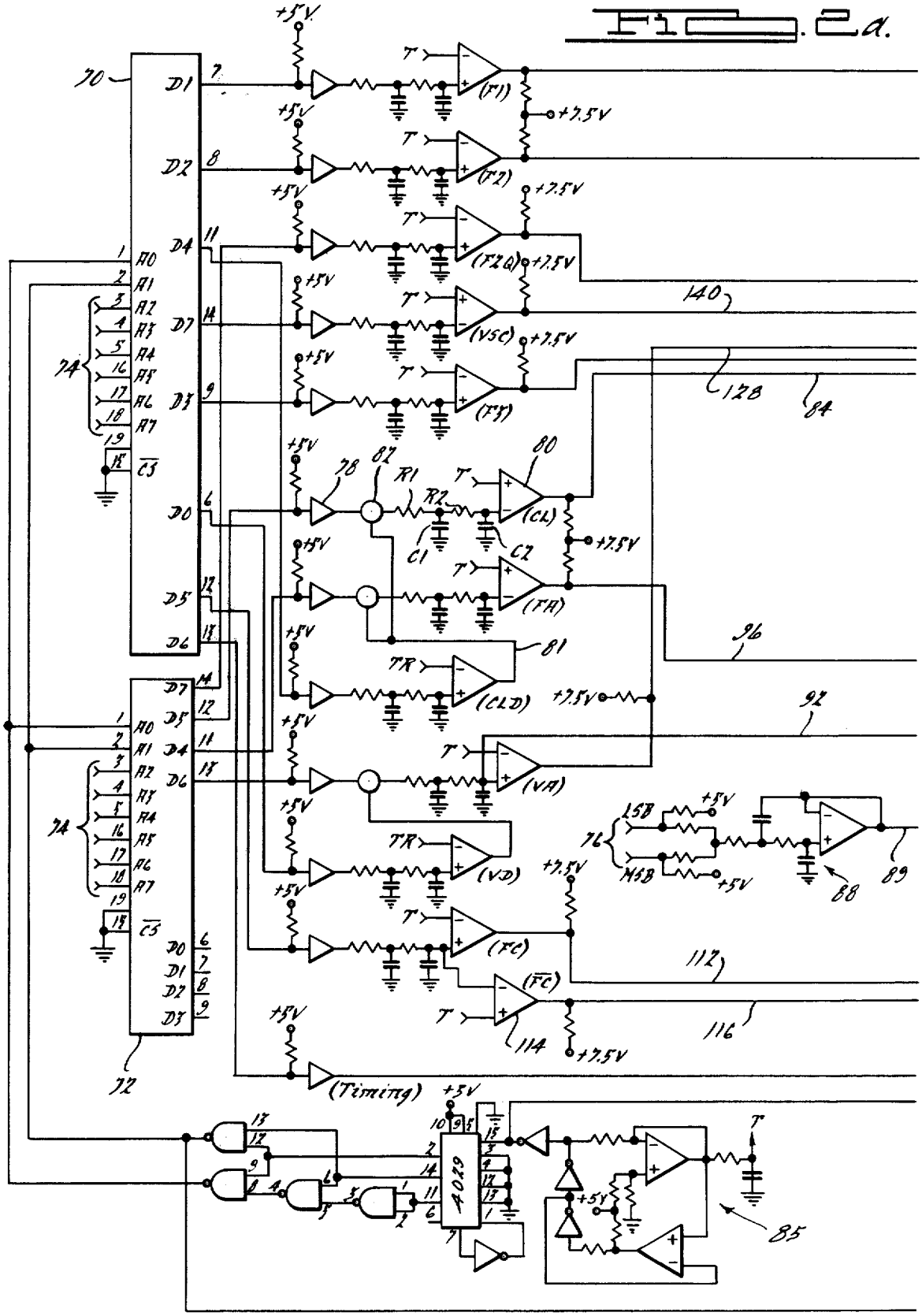
FIGS. 2a and 2b are a circuit diagram of the voice synthesizer shown in FIGS. 1a and 1b.
Figure 2B:
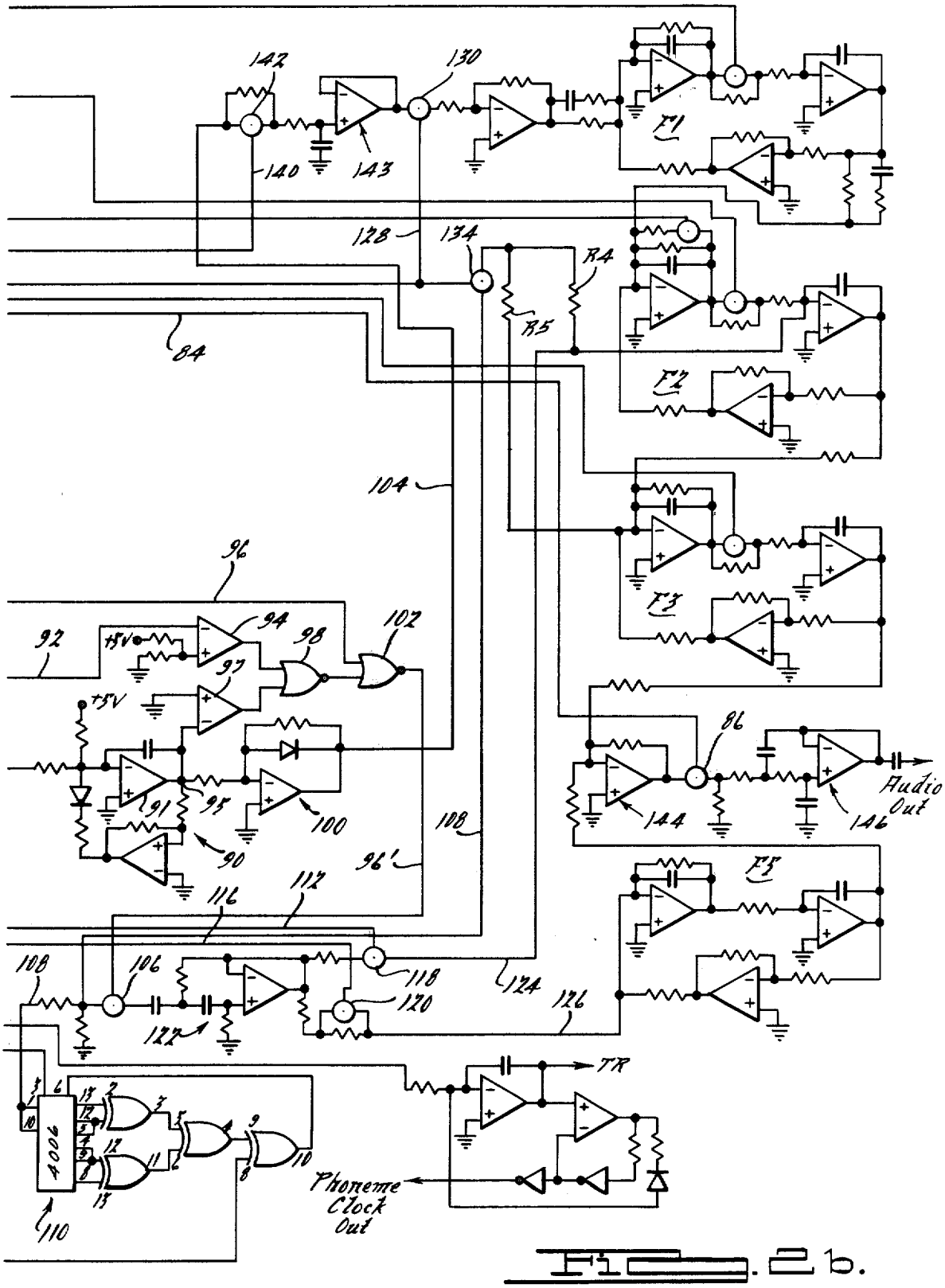
Figure 5:
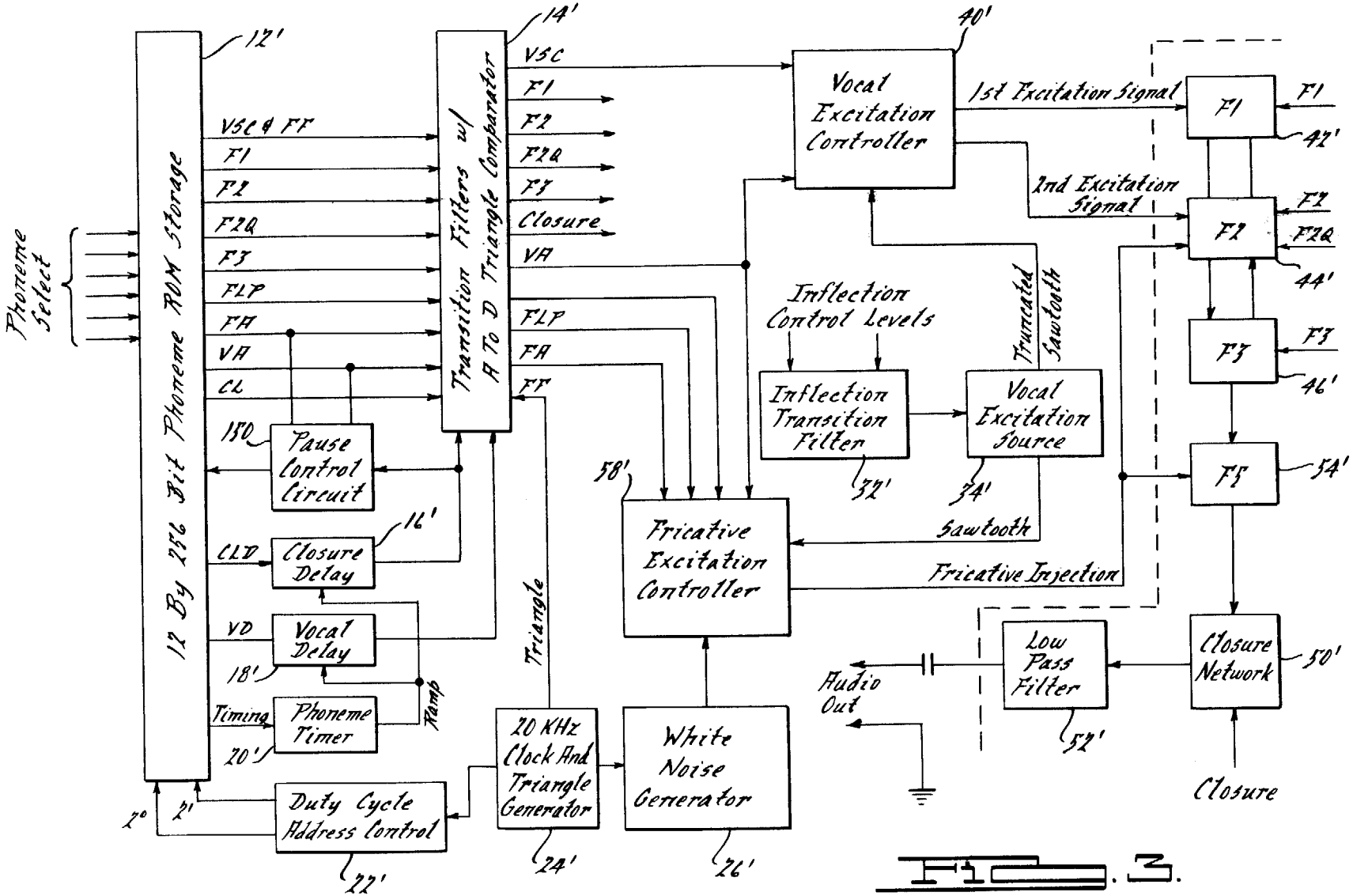

Referring now to FIGS. 2a and 2b, a circuit diagram of the embodiment of the present voice synthesizer illustrated in FIGS. 1a and 1b is shown. As previously mentioned in connection with the description of the block diagram, the present voice synthesizer is adapted to be driven by an 8-bit digital input command word. The six input bits utilized for phoneme selection 74 are connected in parallel to a pair of ROM memories 70 and 72. Two ROM IC chips are utilized to provide the required storage capability previously discussed. As also noted earlier, ROM memories 70 and 72 are adapted to produce binary-weighted duty cycle output control signals comprising the electronic parameters of the synthesized speech. In that the present invention constitutes an improvement in voice synthesizers and much of the circuitry is duplicative for each control signal of the circuitry known to the art, only the circuitry associated with the closure control signal, by example, will be explained in detail.

When a closure control signal is produced at the output of ROM 72, it is provided through a CMOS buffer 78 to a fixed rate RC transition filter comprising resistors R1 and R2 and capacitors C1 and C2. The transition filter as noted, serves to smooth the abrupt amplitude variations in the binary-weighted digital control signal produced by ROM memory 72. Additionally, it will be noted that prior to application to the transition filter, the closure control signal is provided through an analog gate 82, the control terminal of which is connected to the closure delay control signal on line 81. As also discussed above, the closure delay control signal serves to momentarily delay the transmission of the closure control signal (as well as the fricative amplitude control signal) during certain vowel-to-fricative phoneme transitions.

Once the closure control signal has been provided through the transition filter and effectively converted thereby to an analog signal, it is converted back to a digital square wave signal having a duty cycle proportional to the amplitude of the analog signal. This is accomplished by connecting the output of the transition filter to the negative input of a comparator amplifier 80. The positive input of comparator amplifier 80 is supplied with a 20 KHz triangle signal from the output clock circuit 85. Comparator amplifier 80 effectively pulse width modulates the analog control signal provided to its negative input so that the output signal provided on line 84 comprises a square wave signal whose duty cycle is proportional to the magnitude of the analog signal provided to its negative input. The duty cycle closure control signal on line 84 is then provided to the control terminal of an analog gate 86 which is connected in circuit with the audio output line. The closure control signal on line 84 is adapted to momentarily render nonconductive analog gate 86 so as to cause an abrupt amplitude modulation of the audio output. As previously noted, the closure control signal is generated for certain phoneme interactions such as the phoneme "b" followed by the phoneme "e."

As discussed in connection with the description of the block diagram in FIGS. 1a and 1b, the remaining two bits 76 in the 8-bit digital input command word are utilized for inflection control. The two binary-weighted bits 76 are combined and provided through a transition filter 88 to smooth the abrupt amplitude variations in the combined signal. The resulting analog signal on line 89 is provided to a sawtooth generator circuit 90 which essentially comprises an integrator amplifier 91 that is adapted to produce a sawtooth waveform at its output at node 95. The frequency of the sawtooth waveform generated by circuit 90 is dependent upon the magnitude of the signal provided to the negative input of integrator amplifier 91. Thus, it can be seen that by varying the setting of inflection bits 76, the fundamental frequency ($F\phi$) of the glottal waveform is varied.

The sawtooth waveform at node 95 is provided through an additional waveform shaping circuit 100 that is adapted to effectively truncate the sawtooth waveform by subtracting the lower half of the signal. The resulting output signal on line 104 represents the glottal waveform that is injected into the vocal tract. For a more detailed explanation of the vocal excitation source circuitry, see the aforementioned copending U.S. application, Ser. No. 714,495.

Additionally, it will be noted that the sawtooth waveform at node 95 is also provided through an inverting amplifier 97 to the input of a NOR-gate 98. NOR-gate 98 is controlled by the output of op amp 94 which is adapted to enable NOR-gate 98 whenever a vocal amplitude control signal is produced on line 92. When a vocal amplitude control signal is present on line 92, the output from op amp 94 will go LO, thereby causing NOR-gate 98 to "square-up" the sawtooth waveform from the output of op amp 97. The square wave signal from the output of NOR-gate 98 is then provided to the input of another NOR-gate 102 which has its other input connected to receive the fricative amplitude control signal on line 96. Thus, it can be seen that when a vocal amplitude control signal is present on line 92, thereby enabling NOR-gate 98, NOR-gate 102 will "chop" the fricative amplitude control signal on line 96 in accordance with the "squared-up" sawtooth waveform from node 95. When a vocal amplitude control signal is not present on line 92, NOR-gate 98 is thereby inhibited rendering its output LO, which in turn makes NOR-gate 102 appear like an inverter permitting the fricative amplitude control signal on line 96 to pass unaffected by the square wave signal. It will be noted, that since the frequency of the sawtooth waveform at node 95 is approximately 200 times slower than the duty cycle frequency of the fricative amplitude control signal on line 96 (100 Hz vs. 20 KHz), the "chopping" of the fricative amplitude control signal by the sawtooth waveform is effective to substantially diminish the fricative or unvoiced speech component whenever a phoneme requiring voiced energy, as indicated by the presence of a vocal amplitude control signal, is present.

The fricative amplitude control signal from the output of NOR-gate 102 on line 96' is provided to the control terminal of an analog gate 106 that is connected in circuit to the output of the white noise generator 110. The fricative excitation signal on line 108 produced by generator 110 is effectively amplitude modulated by the rapid on/off cycling of analog gate 106 under the control of the fricative amplitude duty signal control signal. The modulated signal is then provided through a 4 KHz high pass filter 122 to an additional pair of analog gates 118 and 120. Analog gates 118 and 120 are adapted to control the injection of fricative excitation energy into the F2 and F5 resonant filters in the vocal tract. Unlike previous synthesizers, the present invention is adapted to control the injection of fricative energy into the vocal tract with a single control parameter; herein the fricative control (FC) signal. Thus, the circuitry required to generate an additional control parameter is eliminated. Upon examination of the frequency spectrum of fricative phonemes, it was determined that for the most part phonemes requiring substantial amounts of low frequency fricative energy in the range of the F2 formant, do not also require substantial amounts of high frequency fricative energy in the range of the F5 formant, and vice versa. For example, for fricative phonemes used as "f" and "p," fricative energy must be injected primarily into the F2 resonant filter, and for phonemes such as "s" and "t," it is necessary to inject fricative energy primarily into the F5 resonant filter. Consequently, the present system is adapted to generate a single fricative control parameter (FC) on line 112 which is also provided through an inverting comparator amplifier 114 to produce the inverse of the fricative control parameter ($\overline{FC}$) on line 116. The fricative control parameter on line 112 is connected to the control terminal of analog gate 118 and is adapted to control the injection of low frequency fricative energy on line 124 into the F2 resonant filter, and the inverse of the fricative control signal on line 116 is connected to the control terminal of analog gate 120 and is adapted to control the injection of high frequency fricative energy on line 126 into the fricative or F5 resonant filter. Thus, it will be appreciated that the amount of fricative energy that is injected into the F2 resonant filter is inversely related to the amount of fricative energy that is injected into the F5 resonant filter.

The voiced component or glottal waveform on line 104 from the voiced excitation source is injected into the vocal tract at the F1 resonant filter. Injection of the voiced component into the vocal tract is controlled by the vocal spectral contour control signal on line 140 and the vocal amplitude control signal on line 128. In particular, the vocal amplitude and vocal spectral contour control signals are connected to the control terminals of analog gates 130 and 142 respectively, which are connected in circuit with the voiced excitation signal on line 104. As previously noted, the vocal spectral contour control signal is adapted to spectrally shape the energy content of the voiced excitation signal by controlling the cutoff frequency of a first order low pass filter 143, and the vocal amplitude control signal is adapted to modulate the amplitude of the voiced excitation signal.

Although the F1, F2, and F3 resonant filters are serially connected, the voiced excitation signal in the preferred embodiment herein does not contain enough high frequency energy to adequately drive the F2 and F3 resonant filters. This, of course, is contrary to conventional practice wherein the first three resonant filters in the vocal tract are driven principally by the voiced component of speech. However, in order to provide the present synthesizer with a more "breathy" or "hoarse" voice, the second and third resonant filters herein are driven principally with fricative energy under the control of the vocal amplitude control signal. Specifically the output from the white noise generator 110 on line 108 is injected directly into the F2 resonant filter through resistor R4 and into the F3 resonant filter through resistor R5. Injection of white noise into the F2 and F3 resonant filters is controlled by analog gate 134 which has its control terminal connected to receive the vocal amplitude control signal on line 128. Thus, it can be seen that the F2 and F3 resonant filters in the present embodiment are driven asynchronously, in parallel, with white noise under the control of the vocal amplitude control signal. The asynchronous drive of the F2 and F3 resonant filters derives from the fact that residual vocal energy from the output of the F1 resonant filter does cause a certain amount of excitation of the F2 and F3 resonant filters. However, due to the inherent delay created by the voice component passing through the F1 resonant filter, the F2 and F3 resonant filters are subject to double excitation; first with fricative energy through resistors R4 and R5 and secondly by the delayed vocal energy from the output of the F1 resonant filter.

Finally, as noted in the block diagram, the output from the F1, F2 and F3 serially connected resonant filters in the vocal tract is combined with the output from the fricative or F5 resonator by summing circuit 144 and provided through a low pass filter circuit 146 to an appropriate audio transducer device.

Looking now to FIG. 3, a block diagram of another embodiment of the present invention is shown. The blocks appearing in FIG. 3 which correspond to blocks shown in the first embodiment illustrated in FIGS. 1a and 1b are labeled with primed reference numerals. As can be readily seen from the diagram, the embodiment illustrated in FIG. 3 is also driven by an 8-bit digital input command word with six of the input bits utilized for phoneme selection and the remaining two bits used for inflection control. As in the first embodiment, the read-only memory unit 12' is adapted to generate 12 control signal parameters for each phoneme. However, it will be noted that one of the signal parameters is utilized to produce two separate control signals, i.e., the vocal spectral contour and fricative frequency control signals. The generation of a separate fricative frequency control signal permits the fricative control signal, as it was referred to in the first embodiment, to be used solely as a fricative low pass (FLP) control signal. Thus, a conventional fricative excitation controller network 58' can be utilized.

The second embodiment also includes a unique pause control circuit 150 which is adapted to "hold" the values of certain critical control parameters from the output of ROM 12' whenever a pause in the audio output is detected. The purpose of the pause control circuit 150 is to prevent the values of the critical control parameters from changing and thus altering the characteristics of the vocal tract 60 before the audio has completely faded out. The pause control circuit 150 is adapted to detect a pause by continuously monitoring the fricative amplitude and vocal amplitude control signals and providing an output signal whenever both signals are LO. The output signal produced thereby is fed back to the latch circuits at the outputs of ROM 12' to "hold" the parameters at their current values. The pause control circuit 150 is further adapted to terminate the "hold" signal after a predetermined period into the pause phoneme as determined by the closure delay control signal from closure delay network 16'.

The remaining differences in the present embodiment are found in the vocal tract 60' and the manner in which the voiced and unvoiced excitation signals are injected into the vocal tract 60'. Specifically, the F1, F2, F3 and F5 resonant filters 42',44', 46' and 54' respectively, in the present embodiment are all serially connected rather than having the F5 resonant filter connected in parallel with the first three serially connected resonant filters as in the first embodiment. Additionally it will be noted that a feedback path has been added between the F2 and F1 resonant filters 44' and 42', between the F3 and F2 resonant filters 46' and 44'. These feedback paths are provided to simulate the back pressures which are generated in the human voice system between the tongue, mouth and vocal chords.

Finally, it will be noted that the present embodiment also provides asynchronous parallel excitation of the vocal tract 60'. However, unlike the first embodiment, the asynchronous parallel excitation herein is supplied solely by the voiced component. In particular, it can be seen that the output from the fricative excitation controller 58' is only injected in parallel into the F2 and F5 resonant filters 44' and 54' in the conventional manner. However, the voiced excitation signal from the output of the vocal excitation controller 40', in addition to being injected into the F1 resonant filter 42', is also injected in parallel into the F2 resonant filter 44'. Thus, the F2 resonant filter 44', and to a lesser extent the F3 resonant filter 46', are driven twice; first by the direct injection of vocal energy into the F2 resonant filter 44', and subsequently by the delayed vocal energy from the output of the F1 resonant filter 42'. The purpose of this arrangement is to more accurately simulate the true action of the human glottis which provides a type of "double" excitation of the vocal chords each time it opens and closes.

Figure 4A:
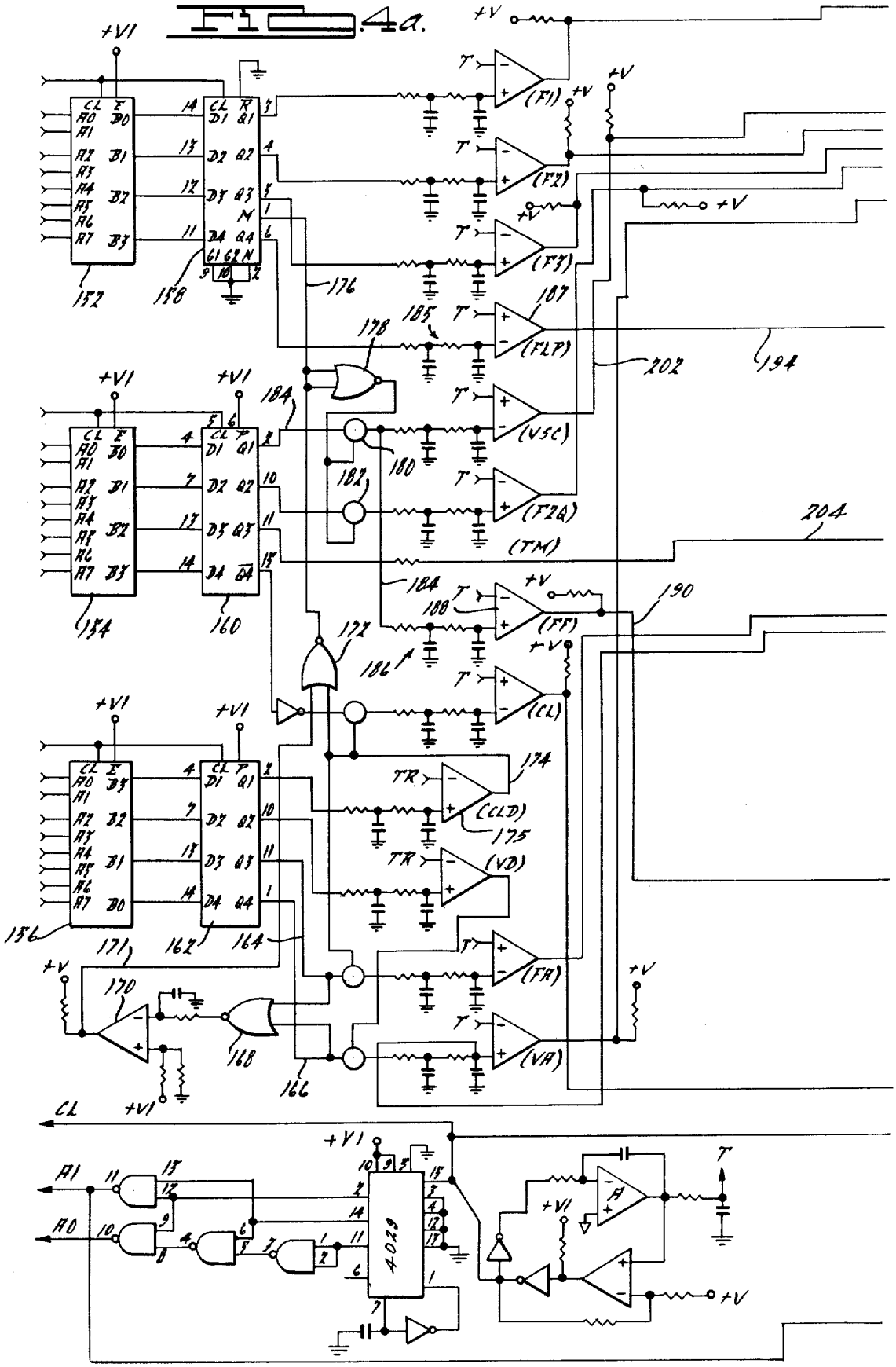
FIGS. 4a and 4b are a circuit diagram of the voice synthesizer shown in FIG. 3.
Figure 4B:
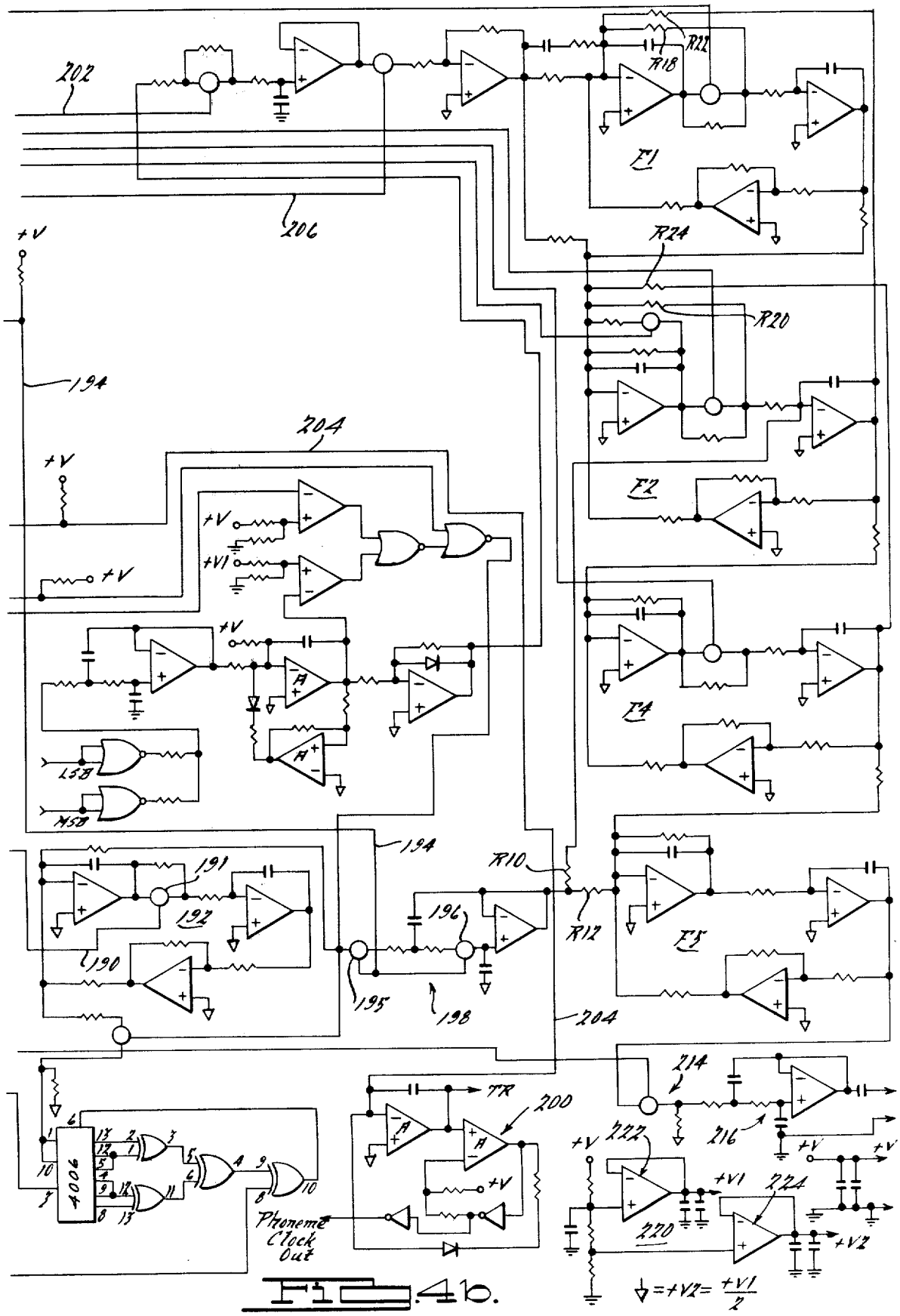

Referring not to FIGS. 4a and 4b, a circuit diagram of the embodiment of the present invention illustrated in FIG. 3 is shown. At the outset, it is to be noted that the voice synthesizer illustrated in FIGS. 4a and 4b is adapted to operate off a 12 volt power supply. In actuality, the system will function off a supply that varies anywhere from 6 volts to 15 volts. Thus, this embodiment of the present invention is particularly suited for use in combination with a portable battery power source.

The power requirements of the present system is such that four discrete voltage levels are needed. In addition to the +V (e.g. 12 volts) and ground potentials provided by the battery, the present system includes a power supply circuit 220 that is adapted to generate two additional voltage levels, designated +V1 and +V2, between +V and ground. However, since the voltage output of a battery will vary over its useful life, it is important that the +V1 and +V2 voltage levels vary correspondingly. Thus, the present power supply circuit 220 includes a pair of voltage follower circuits 222 and 224 which are adapted to produce output signals that "follow" variations in the voltage level of the signals provided to their inputs.

Additionally, the change to a variable power source also mandates the use of op amps in certain portions of the circuit that are capable of providing an adequate current sink at their minimum rated voltage. Accordingly, the preferred embodiment utilizes Fairchile 798 op amps for those op amps designated with the letter "A."

The ROM storage requirement is supplied in this embodiment by three individual CMOS ROM memory chips 152, 154, and 156, herein No. MC14524. The outputs from ROM memories 152, 154, and 156 are provided to latch circuits 158, 160 and 162 respectively, which serve the purpose of the CMOS buffers used in the first embodiment to drive the slow-acting transition filters, and also serve to inhibit the CMOS ROM data outputs from going HI during address switching. Latch circuit 158 is a tri-state latch, the third state providing a sample-and-hold function.

As discussed previously, the transitional changes in the values of the more critical control parameters may give rise to a condition most noticeable with the last phoneme before a pause, wherein the value of the control parameters may change prior to complete dissipation of the excitation energy in the vocal tract. The result is that the last phoneme before a pause will begin to take on a different characteristic and therefore a different sound as the audio fades out. To rectify this situation, the fricative amplitude control signal on line 164 and the vocal amplitude control signal on line 166 are provided to a NOR-gate 168 which has its output connected to the negative input of a comparator amplifier 170. When both the fricative amplitude and vocal amplitude control signals are LO, the output from NOR-gate 168 will go HI, causing the output of comparator amplifier 170 on line 171 to go LO. The LO signal on line 171 in turn causes the output of NOR-gate 172 to go HI, thereby switching tri-state latch 158 to its sample-and-hold state. Additionally, the HI output signal from NOR-gate 172 on line 176 is provided through an inverter 178 to the control terminals of a pair of analog gates 180 and 182. Analog gates 180 and 182 are connected in circuit with the vocal spectral contour (VSC+FF) and F2Q control signals respectively, appearing at the Q1 and Q2 outputs of latch circuit 160. When the signal on line 176 goes HI causing the output of inverter 178 to go LO, analog gates 180 and 182 are open circuited, thus isolating the transition filters associated with the VSC+FF and F2Q control signals from further changes in the output state of latch 160.

Thus, it can be seen that whenever a pause phoneme is detected, as determined by the absence of both the vocal amplitude and fricative amplitude control signals, the F1, F2, F3, and FLP control signal parameters appearing at the outputs of tri-state latch 158 are held at their current values, and the transition filters associated with the vocal spectral contour, fricative frequency, and F2Q control signals are isolated from the outputs of latch 160. Accordingly, it can be seen that the capacitors in the transition filters associated with each of the various critical control signal parameters identified are effectively isolated during the initial part of the pause phoneme from further changes in the ROM outputs to insure that the vocal energy in the vocal tract completely fades out before the existing phoneme parameters are changed.

The HI signal on line 176 at the output of NOR-gate 172 is automatically terminated after a predetermined period of time into the pause phoneme to permit resumption of normal circuit operation. In particular, the other input to NOR-gate 172 is connected to receive the closure delay (CLD) duty cycle control signal on line 174 from the output of comparator amplifier 175. The output from comparator amplifier 175 is always initially LO at the beginning of a phoneme period due to the triangle ramp signal (TR) provided to its negative input from the phoneme timer circuit 200. However, after a predetermined period of time less than the duration of an entire phoneme period, the magnitude of the TR signal will drop below the magnitude of the CLD control signal provided to the positive input of comparator amplifier 175, thus causing its output on line 174 to go HI. The predetermined period of time is, of course, dependent upon the slope of the TR signal which is in turn controlled by the phoneme timing control signal on line 204. When the closure delay duty cycle control signal on line 174 goes HI, the output of NOR-gate 172 goes LO, thus removing the sample-and-hold signal from tri-state latch 158 and rendering analog gates 180 and 182 conductive.

Additionally, it will be noted that the same control signal parameter from the Q1 output of latch circuit 160 on line 184 is provided to two separate transition filter circuits 185 and 186. The output from transition filter 185 is provided through an analog-to-digital converter 187 to provide the vocal spectral contour duty cycle control signal on line 202, and the output from transition filter 186 is provided through an analog-to-digital converter 188 to provide the fricative frequency duty cycle control signal on line 190. Thus, it can be seen that a single control signal parameter on line 184 is utilized to provide both the vocal spectral contour control signal on line 202 and the fricative frequency control signal on line 190.

As noted in the discussion of the block diagram of FIG. 3, the generation of a separate fricative frequency control signal permits the ue of a conventional controller network comprising separately controlled bandpass and low pass filter circuits, 192 and 198 respectively. In particular, the fricative frequency control signal on line 190 is provided to the control terminal of an analog gate 191 which is adapted to control the bandpass of the bandpass filter 192. The remaining fricative control signal, referred to simply as the FC control signal in the first embodiment, is utilized solely as a low pass control signal. Accordingly, the fricative low pass (FLP) control signal on line 194 is provided to the control terminals of a pair of analog gates 195 and 196 which are adapted to control the cut-off frequency of the low pass filter 198 in the fricative excitation controller network. The fricative excitation signal from the controller network is injected into the vocal tract at the F2 resonant filter through resistor R10 and at the F5 resonant filter through resistor R12. Since the value of resistor R10 is substantially greater than the value of resistor R12, the major portion of the fricative excitation energy is injected into the F5 resonant filter.

The vocal excitation signal or glottal waveform on line 200 is spectrally shaped and amplitude modulated under the control of the vocal spectral contour control signal on line 202 and the vocal amplitude control signal on line 206, respectively. The glottal waveform is then injected into the vocal tract at the F1 resonant filter through resistor R14 and at the F2 resonant filter through resistor R16. Thus, as in the first embodiment, the vocal tract is driven asynchronously due to the fact that the glottal waveform is effectively delayed—i.e., shifted approximately 180°—as it passes through the F1 resonant filter. Accordingly, the F2 and F3 resonant filters are effectively driven twice; first by the direct injection of the voiced excitation signal through resistor R16, and subsequently by the delayed injection of vocal energy from the output of the F1 resonant filter.

By driving the vocal tract asynchronously as described, the present speech synthesizer more closely simulates the true action of the human glottis. Specifically, the glottis does not provide a single excitation of the vocal chords by opening and closing smoothly. Rather, it has been found that the glottis initially closes on one side and then subsequently closes completely with a rapid motion. Accordingly, the vocal tract is effectively excited twice with each complete opening and closing of the glottis. The asynchronous drive of the present system thus simulates this action by providing double vocal excitation of the vocal tract.

Moreover, it has been found that, particularly in view of the fact that an F4 resonant filter is not used, the audio output sounds better if the glottal waveform does not have a substantial amount of high frequency energy when injected into the F1 resonant filter. However, with the high frequency energy of the glottal waveform reduced when injected into the F1 resonant filter, there is insufficient energy remaining in the glottal waveform at the output of the F1 resonant filter to adequately drive the F2 and F3 resonant filters. Accordingly, the parallel injection of the voiced excitation signal into the F2 resonant filter also serves to provide adequate high frequency vocal energy to the F2 and F3 resonant filters.

Additionally, it will be noted that a feedback resistor R22 is provided between the output of the F2 resonant filter and the input of the F1 resonant filter, and another feedback resistor R24 is provided between the output of the F3 resonant filter and the input to the F2 resonant filter. These feedback resistors simulate the normal back pressures which are present in the human vocal system. Specifically, when the mouth closes, the back pressure created affects the vibration of the vocal chords. Similarly, the movement of the tongue also creates back pressures which affect the vibration of the vocal chords. Thus, the inter-resonant feedback provided by resistors R22 and R24 serve to more closely model the present vocal tract to the human voice system. Also it will be noted that a pair of resistors R18 and R20 are provided across the bandpass sections of the F1 and F2 resonant filters, respectively. It has been found that "Q" or bandpass of the F1 and F2 resonant filters varies inversely with changes in the resonant frequencies of the filters, although to a lesser extent. Thus, resistors R18 and R20 are provided to implement this feature.

Finally, as noted in the block diagram in FIG. 3, the present embodiment utilizes a completely serially connected vocal tract. In particular, the F1, F2, F3 and F5 resonant filters are all connected in cascaded form, with the output from the F5 resonant filter provided through the closure network 214 and a 20 KHz low pass filter 216 to an appropriate audio transducer device.

While the above description constitutes the preferred embodiments of the invention, it will be appreciated that the invention is susceptible to modification, variation and change without departing from the proper scope or fair meaning of the accompanying claims.

What is claimed is:

1. In an electronic device for phonetically synthesizing human speech including input means responsive to input data identifying a desired sequence of phonemes for producing a plurality of control signals that electronically define each phoneme in said desired sequence of phonemes, including a first control signal for controlling the amplitude of the voiced component of speech and a second control signal for controlling the amplitude of the unvoiced component of speech;

vocal source means for producing a voiced excitation signal;

fricative source means for producing an unvoiced excitation signal; and vocal tract means responsive to said voiced and unvoiced excitation signals and certain of said plurality of control signals for substantially producing the frequency spectrums of each of said desired sequence of phonemes, including a first resonant filter tunable under the control of a third of said control signals for producing the first formant in said frequency spectrums and a second resonant filter serially connected to said first resonant filter and tunable under the control of a fourth of said control signals for producing the second formant in said frequency spectrums;

the improvement comprising controller means for injecting said voiced and unvoiced excitation signals into said vocal tract means including first controller means for injecting excitation energy in parallel into said first and second resonant filters under the control of said first control signal and second controller means for injecting excitation energy into said vocal tract means under the control of said second control signal.

2. The speech synthesizer of claim 1 wherein said first controller means is adapted to inject said voiced excitation signal in parallel into said first and second resonant filters.

3. The speech synthesizer of claim 1 wherein said first controller means is adapted to inject said voiced excitation signal into said first resonant filter and said unvoiced excitation signal into said second resonant filter.

4. The speech synthesizer of claim 3 wherein said vocal tract means further includes a third resonant filter serially connected to said second resonant filter and tunable under the control of a fifth of said control signals for producing the third formant in said frequency spectrums, and said first controller means is further adapted to inject said unvoiced excitation signal into said third resonant filter under the control of said first control signal.

5. The speech synthesizer of claim 4 wherein said second controller means is adapted to inject said unvoiced excitation signal into said vocal tract means.

6. The speech synthesizer of claim 5 wherein said vocal tract means further includes a fourth resonant filter for producing the fifth formant in said frequency spectrums, and said second controller means is adapted to inject said unvoiced excitation signal in parallel into said second and fourth resonant filters.

7. The speech synthesizer of claim 6 wherein said fourth resonant filter is connected in parallel with said serially connected first, second, and third resonant filters.

8. The speech synthesizer of claim 2 wherein said second controller means is adapted to inject said unvoiced excitation signal into said vocal tract means.

9. The speech synthesizer of claim 8 wherein said vocal tract means further includes a third resonant filter serially connected to said second resonant filter and tunable under the control of a fifth of said control signals for producing the third formant in said frequency spectrums and a fourth resonant filter for producing the fifth resonant formant in said frequency spectrums, and said second controller means is adapted to inject said unvoiced excitation signal in parallel into said second and fourth resonant filters.

10. The speech synthesizer of claim 9 wherein said fourth resonant filter is serially connected to said third resonant filter.

11. The speech synthesizer of claim 1 further including pause control means connected to said input means for producing an output signal that is effective to cause said input means to maintain the current values of certain of said control signals beyond the normal phoneme period whenever both said first and second control signals are absent.

12. The speech synthesizer of claim 11 wherein said pause control means is further adapted to terminate production of said output signal after a predetermined time period less than the duration of an entire phoneme period in accordance with one of said control signals.

13. The speech synthesizer of claim 12 wherein said one control signal is a closure delay control signal.

14. The speech synthesizer of claim 1 wherein said vocal tract means further includes a third resonant filter for producing the third formant in said frequency spectrums and a fourth resonant filter for producing the fifth formant in said frequency spectrums, and said second controller means is further adapted to inject said unvoiced excitation signal into said second resonant filter under the additional control of another of said control signals and also inject said unvoiced excitation signal into said fourth resonant filter under the additional control of the inverse of said another control signal.

15. The speech synthesizer of claim 14 wherein said third resonant filter is serially connected to said second resonant filter and said fourth resonant filter is connected in parallel with said first, second, and third resonant filters.

16. In an electronic device for phonetically synthesizing human speech including vocal source means for producing a voiced excitation signal;

fricative source means for producing an unvoiced excitation signal;

input means responsive to input data identifying a desired sequence of phonemes for producing a plurality of control signals that electronically define each phoneme in said desired sequence of phonemes, including a first control signal for controlling the amplitude of said voiced excitation signal and a second control signal for controlling the amplitude of said unvoiced excitation signal; and vocal tract means responsive to said voiced and unvoiced excitation signals and certain of said plurality of control signals for substantially producing the frequency spectrums of each of said desired sequence of phonemes;

the improvement comprising pause control means connected to said input means for producing an output signal that is effective to cause said input means to maintain the current values of certain of said control signals beyond the normal phoneme period whenever both said first and second control signals are absent.

17. The speech synthesizer of claim 16 wherein said pause control means is further adapted to terminate production of said output signal after a predetermined time period less than the duration of an entire phoneme period in accordance with one of said control signals that is produced at the beginning of each phoneme.

18. The speech synthesizer of claim 17 wherein said one control signal is a closure delay control signal.

*19. In an electronic device for phonetically synthesizing human speech including*

*input means response to input data identifying a desired sequence of phonemes for producing a plurality of control signals that electronically define each phoneme in said desired sequence of phonemes;*

*vocal source means for producing a voiced excitation signal;*

*fricative source means for producing an unvoiced excitation signal; and*

*vocal tract means responsive to said voiced and unvoiced excitation signals and certain of said plurality of control signals for substantially producing the frequency spectrums of each of said desired sequence of phonemes, including a first resonant filter tunable under the control of a first of said control signals for producing the first formant in said frequency spectrums, a second resonant filter serially connected to said first resonant filter and tunable under the control of a second of said control signals for producing the second formant in said frequency spectrums, a third resonant filter serially connected to said second resonant filter for producing the third formant in said frequency spectrums and a fourth resonant filter for producing a fourth formant in said frequency spectrums;*

*the improvement comprising controller means for controlling the injection of said voiced and unvoiced excitation signals into said vocal tract means including fricative control means for injecting said unvoiced excitation signal into said second resonant filter under the control of a third of said control signals and for injecting said unvoiced excitation signal into said fourth resonant filter under the control of the inverse of said third control signal such that the amount of*

*unvoiced excitation energy injected into said second resonant filter is inversely related to the amount of unvoiced excitation energy injected into said fourth resonant filter.*

*20. The speech synthesizer of claim 19 wherein said fricative control means is further adapted to modulate the amplitude of said unvoiced excitation signal in accordance with a fourth control signal prior to injecting said unvoiced excitation signal into said vocal tract under the control of said third control signal.*

* * * * *